May 3, 1955
M. A. MOSKOVITZ
2,707,645
JOINT
Filed Feb. 9, 1951
2 Sheets-Sheet 1
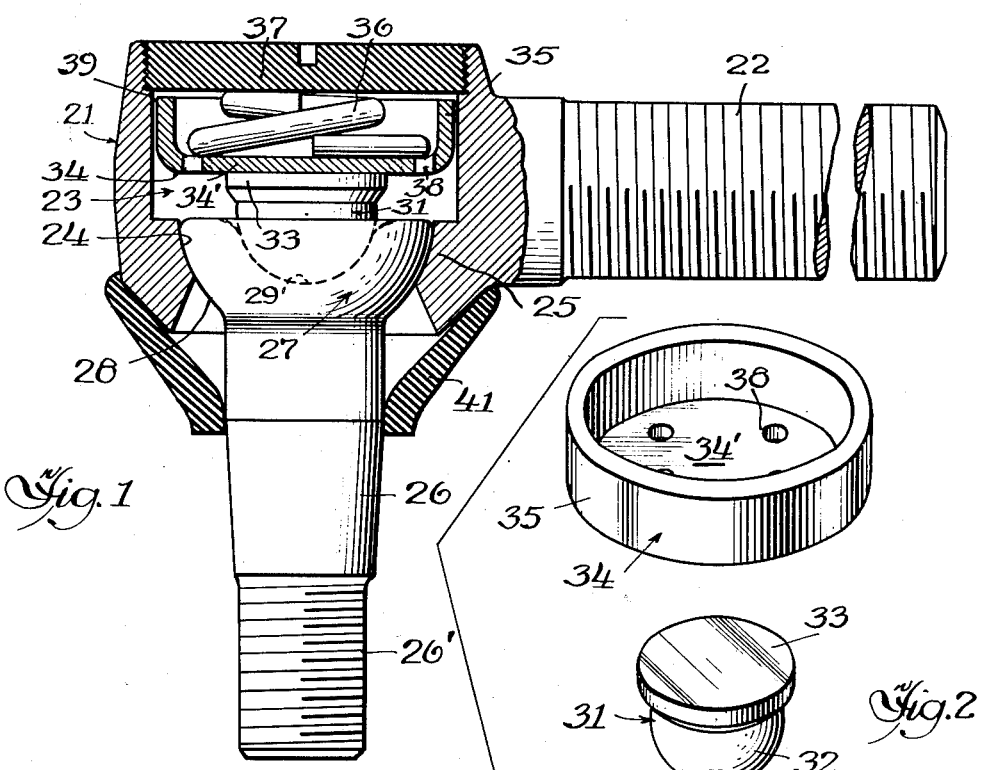
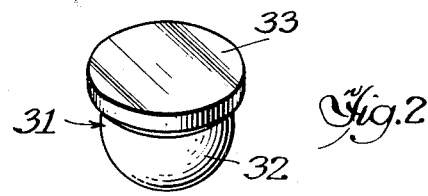
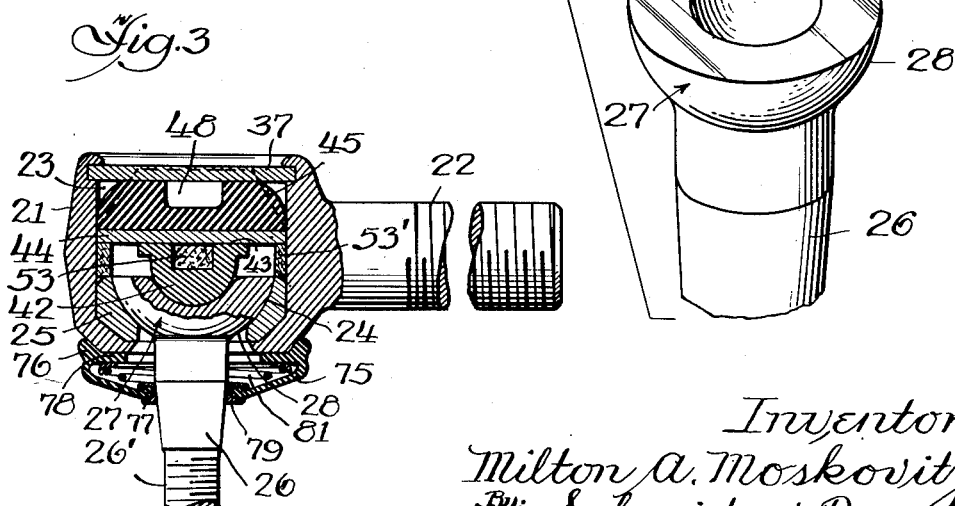
Inventor
Milton A. Moskovitz
By: Schneider & Dressler
Attys.

May 3, 1955      M. A. MOSKOVITZ      2,707,645
JOINT
Filed Feb. 9, 1951      2 Sheets-Sheet 2
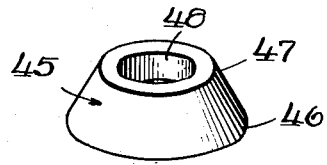
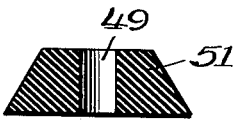
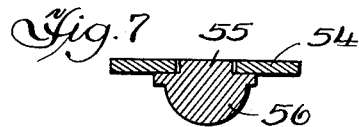
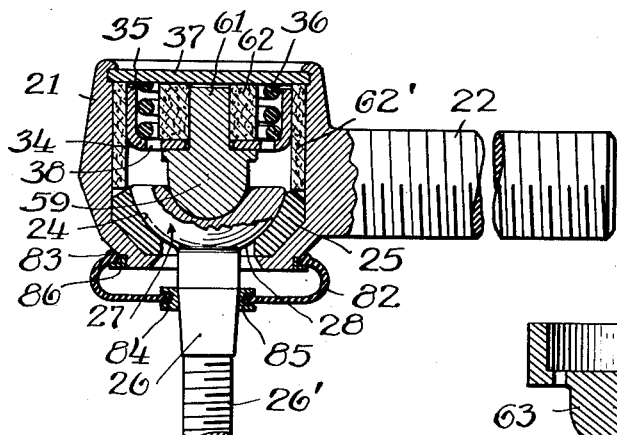
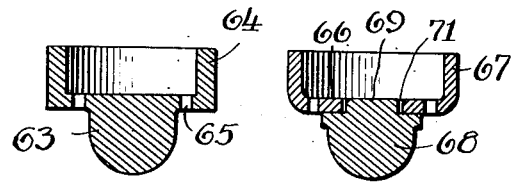
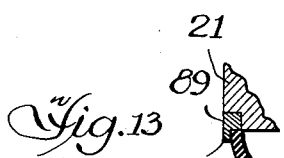
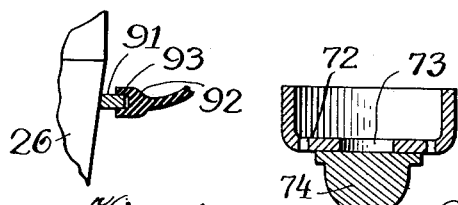
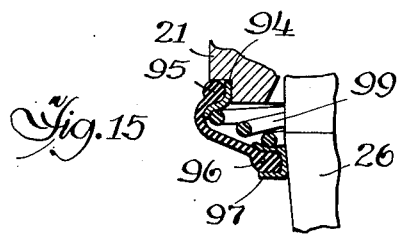
Inventor,
Milton A. Moskovitz
By Schneider & Dressler,
Attys.

United States Patent Office 2,707,645
Patented May 3, 1955

2,707,645

JOINT

Milton A. Moskovitz, St. Louis, Mo., assignor of one-half to Harry Frankel, St. Louis, Mo.

Application February 9, 1951, Serial No. 210,247

2 Claims. (Cl. 287—90)

This invention relates to ball and socket joints and more particularly to ball and socket joints used in automobiles, for example, the tie rod joint of the steering mechanism.

The present invention contemplates the provision of a joint in which a movable ball head is constantly urged against a bearing surface by a pressure member seated in said ball head. Bearing contact between the pressure member and the ball head and the ball head and bearing surface is maintained by resilient means operating upon the pressure member. The joint is constructed to allow freedom of movement between the various parts although they are held together under pressure. Thus a stud connected to the ball head is free to move as the ball head moves on the bearing surface and the resilient means cooperates to compensate for wear and to insure that the automobile will steer easily and be insulated against noise, vibration and road shock between the steering mechanism and the wheels.

The elements of the joint are so constructed as to minimize wear between the various surfaces of the joint in contact with one another and to eliminate fatigue of the resilient means. Such a construction insures efficiency in operation together with long and trouble-free use of the joint.

Other advantages of the joint constructed in accordance with the present invention will be apparent from the following description, taken in conjunction with the accompanying drawings showing preferred embodiments of the invention, in which:

Figure 1 is a cross sectional view of the joint, with parts shown in elevation;

Fig. 2 is an exploded view in perspective showing the pressure plate, pressure member and ball head of the structure shown in Fig. 1;

Fig. 3 is a cross sectional view, with parts broken away and shown in elevation, of a modified form of joint;

Fig. 4 is a perspective view of the resilient expansion element shown in Fig. 3;

Figs. 5 and 6 are cross sectional views of modified forms of expansion elements;

Figs. 7 and 8 are cross sectional views of modified forms of pressure transmitting means;

Fig. 9 is a cross sectional view, with parts broken away and shown in elevation, of another modified form of joint;

Figs. 10, 11 and 12 are cross sectional views of modified forms of pressure transmitting means; and Figs. 13, 14 and 15 are cross sectional details of modifications of dust shields, showing the manner of securing the dust shields to the joint.

Referring to the drawings, in which like numbers are used to identify like parts in the various modifications, the joint is enclosed in a housing 21 having a conventionally threaded shank 22 extending laterally therefrom. As will be seen in Fig. 1, the housing 21 has an axial bore transverse to shank 22, defining a chamber 23 therein. The lower end of this chamber has a spherical bearing surface 24 formed on an inwardly projecting portion or bushing 25. The bushing 25 may be integral with housing 21 as shown in Fig. 1, or it may be a separate member within the housing (Figs. 3 and 9).

Cooperating with shank 22 to form the other end of the joint is a stud or bolt having a shank portion 26 at its upper end and a conventionally threaded lower portion 26'. Connected to the top of shank 26 is a ball head 27. The outer convex surface 28 of the ball head 27 is a fragment of a sphere and seats accurately on the bearing surface 24 so that the stud may move in any direction. Concentric with the outer convex surface 28 of the ball head 27 and at the top thereof is a central recess or cavity 29 adapted to have a pressure member 31 seated therein.

In Figs. 1 and 2 the pressure member 31 is provided with a rounded bottom portion 32 adapted to seat in the cavity 29 of the ball head 27. The upper portion 33 of the pressure member 31 is flat so as to be in slidable, self-alignable face to face contact with a flat face of a pressure plate 34. Pressure plate 34 is longitudinally movable within the housing 21 and is guided in such movement by the inner vertical wall defining chamber 23. It has a flat bottom portion 34' and an upstanding circumferential flange 35, and the over-all shape of the pressure plate is cup-like. A tension spring 36, or other suitable resilient means such as shown in Figs. 3–6, is positioned in the cavity of the pressure plate 34 and bears against the flat bottom 34' and a closure plate or cover 37. The cover may be screwed into the housing 21 as shown in Fig. 1, so that the cover and the above described movable parts may easily be removed, or the housing may be peened or otherwise bent inwardly to confine the cover in place (Figs. 3 and 9). Before the cover 37 is put in place, the parts are suitably lubricated and an excess of lubricant may be inserted in the chamber 23 of housing 21. Holes 38 in pressure plate 34 allow the lubricant to pass from one portion of the assembly to the other as spring 36 is compressed or expands in use, especially as the vehicle travels over rough roads or obstacles. Holes 38 are spaced about a circumference of a circle whose diameter corresponds substantially with the diameter of ball head 27, so that lubricant driven through the holes toward the ball head will be directed to the complementary bearing surfaces. If desired, pressure member 31 and the bushing 25 may be made of an oil permeable metal so as to be self-lubricating. If desired, housing 21 and/or cover 37 may be provided with means through which lubricant may be added to chamber 23.

When the joint is assembled with the cover 37 in place as shown in Fig. 1, the spring 36 exerts a constant downward force upon the pressure plate 34, pressure member 31 and ball head 27. The rounded bottom 32 of the pressure member 31 is firmly seated in the recess 29 of the ball head 27, and the convex surface 28 of the ball head is firmly seated on the bearing surface 24. Although the ball head 27 is under constant downward pressure, it is free to move on the bearing surface 24 and rotate about or with respect to the pressure member 31. In order to achieve the highest degree of tilt of the stud, it will be noted that I prefer to enlarge or flare the spherical recess of the top of the stud outwardly (as shown clearly in Figs. 1, 3 and 9). Further, the portion of the pressure element that is arranged upwardly of its rounded portion 32 is provided with a cylindrical extension or body portion, and this extension is then radially enlarged to provide the peripheral flange whose uppermost face is flat to provide the surface 33. In this way, there is afforded quite an appreciable spacing between the top face and the flange, and spacing the plate correspondingly from the ball head, to permit of a great degree of tilting of said stud without bringing the ball head against said flange, while at the same time affording a maximum of strength and flat bearing engagement to the element 31.

Spring 36 exerts force in a direction perpendicular to shank 22, yet permits movement of ball head 27 with respect to bearing surface 24 and pressure member 31. Any sudden movement of the stud and rotation of the ball head 27 will exert some force on the pressure member 31 in a lateral direction. This force is largely absorbed by the arrangement of elements described and, consequently, wear on the bearing surfaces is reduced to a minimum. Thus the described arrangement of elements permits sliding surface contact between the flat bottom face of the pressure plate 34 and the flat top portion 33 of the pressure member 31, so that any lateral force will cause a relative sliding movement between these two surfaces and thereby absorb the shocks and reduce wear. A mere sliding clearance 39 between the walls of the housing 21 and the circumferential flange 35 is provided to permit free longitudinal movement of pressure plate 34 and yet insure grease transfer through holes 38. Thus, as the vehicle is bounced and jolted during travel, the pressure plate will act to force lubricant from time to time in opposite directions through said holes. Oxidation and hardening of the grease lubricant at any place within the housing is thus prevented by such movement of the lubricant.

Spring 36 not only serves to supply pressure to the cooperating elements of the joint, but also acts as a shock absorber and as a means to reduce the transmission of noises between the wheels and the steering apparatus. When sudden stress is applied to the stud 26 in an upward direction, it will be transmitted to, and absorbed by, the spring 36. Undue stress on the spring and consequent fatigue and failure thereof are prevented by the circumferential flange 35 engaging the cover 37, and thus limit the spring compression. Flange 35 also limits possible movement of the ball head 27 off of the bearing surface 24 and by so doing prevents undue wear of the ball head and bearing surface caused by repeated shocks. Any movement of the ball head off of the bearing surface is also damped by the spring 36.

In order to further minimize wear on the cooperating parts, it is desirable to employ a shield to keep dust and dirt out of the joint and to retain the lubricant contained therein in a clean condition. Such a shield may consist of a collar 41 preferably fashioned from a resilient material, suitably synthetic rubber, secured in any suitable manner between the lower portion of the housing 21 and the stud shank 26. Other types of shields are shown in Figs. 3, 9 and 13–15 and will be described below.

The modified joint shown in Fig. 3 is similar to the joint of Fig. 1. It has a housing 21, a chamber 23, and a bushing 25 at the lower end of the chamber. The bushing has a bearing surface 24. A ball head 27 is seated on the bearing surface 24 and a pressure member 42, seated in a recess at the top of the ball head, exerts a downward force upon the ball head. The pressure member 42 has a flat top portion 43 in slidable surface contact with a flat pressure plate 44. Downward force is exerted upon the pressure plate 44, pressure member 42 and ball head 27 by means of a resilient element or plug 45 positioned between the cover 37 and the pressure plate 44.

Plug 45 may be made from natural or synthetic rubber or other suitable resilient material and is preferably initially of the shapes shown in Figs. 4, 5 and 6 and in dotted lines in Fig. 3. Although it is desirable that this plug prevent the leaking of lubricant upwardly therepast (in the position of the parts indicated in Fig. 3), yet it is important that the pressure of the plug laterally outwardly against the peripheral wall of the housing be limited so as not to destroy the inherent resiliency of the plug after it has been placed into the assembly.

The most efficient shape of plug is that of a frustum of a cone. As shown, plug 45 has this shape. The widest portion of the plug is base 46 which is positioned on pressure plate 44. The narrowest end 47 is at the top. The base is initially slightly smaller than the transverse area of that portion of the socket chamber which it is intended to occupy and is adapted to be either slidably or fixedly supported on the upper face of the pressure plate 44. The initial height or thickness of the plug as indicated in dotted lines, is somewhat greater than its final thickness when compressed into its place within the housing, the full lines of Fig. 3 indicating the final or compressed position of the plug. Plug 45 is so proportioned that it will provide the necessary lateral and axial pressures when distorted into operating shape, and it will furnish sufficient resiliency to absorb and dampen shocks to which the joint will be subjected.

Recessing of the plug, as indicated at 48, or by an end to end bore 49 of the plug 51 (Fig. 5), will tend to adjust the compression pressures and will alleviate any excessive rubber to metal contact, thereby preventing the rapid deterioration of the plug. Air trapped in recess 48 during compression of plug 45 will serve to further cushion shock and improve adjustment of compression pressures. The plug may be made in solid form as shown in Fig. 6, if desired. By fashioning the plug in conical shape there is a minimum of rubber to metal contact at the side walls of the plug, and only a small portion at the lower periphery of the plug is in contact with the housing when the plug is compressed. The sharp peripheral edge at the base of the plug is desirable because it facilitates alignment of the plug in the assembly.

Pressure member 42 may be provided with a recess at the upper portion thereof so as to receive an oil-containing wick 53 therein. A similar wick 53' may be inserted between the pressure plate 44 and the bushing 25 about the periphery of chamber 23. These wicks are particularly useful where the pressure member 42 and bushing 25 are fashioned from an oil-permeable metal, and furnish an ample reserve supply of lubricant for the bearings. Pressure plate 44 fits slidably against the walls defining chamber 23 and aids in preventing the passage of lubricant from the wicks to the plug.

When the joint shown in Fig. 3 is subjected to shocks, they will be absorbed and damped by plug 45. Any lateral forces exerted upon the pressure chamber 42 will be absorbed by the relative slidable contact between the flat faces of the pressure member and the pressure plate 44 in a manner similar to that described above.

Figs. 7 and 8 illustrate further modifications of the pressure plate and pressure member. In Fig. 7, the pressure plate 54 has a central opening therethrough to receive a neck 55 of the pressure member 56. Relative lateral sliding movement between the pressure member 56 and the pressure plate 54 may be obtained by providing an appropriate clearance between the outer periphery of the neck 55 and the opening in the pressure plate. Fig. 8 shows an inexpensive one-piece construction in which the pressure member 57 is integral with the pressure plate 58.

Fig. 9 shows a joint similar to those shown in Figs. 1 and 3. In this modification, the pressure member 59 has an upstanding neck 61 which projects through a central opening in the pressure plate 34 and terminates short of the cover 37 a distance substantially equal to the distance between the cover and the upstanding circumferential flange 35 of the pressure plate 34. The neck 61 cooperates with the flange 35 to prevent fatigue of the spring 36 as described above. If an oil-permeable metal is used for the pressure member 59 and bushing 25, an oil-containing wick 62 surrounding the neck 61 and a similar wick 62' between upstanding flange 35 and the inner periphery of the housing 21 are desirable to furnish a reserve supply of lubricant. Spacing may be provided between the upstanding neck 61 and the pressure plate 34, as shown, to allow for relative lateral movement between pressure member 59 and pressure plate 34 and lubrication of the relatively slidable surfaces.

Figs. 10–12 illustrate still further modifications of the pressure transmitting means, in which the showing of a resilient element, a spring, for example, has been eliminated for purposes of clarity. In Fig. 10, the pressure plate per se has been eliminated, and the pressure member 63 and the upstanding flange 64 are integral. Holes 65 are provided for the passage of lubricant therethrough. Fig. 11 shows a pressure plate 66 having an upstanding flange 67. The pressure member 68 has a neck 69 projecting through an opening in the pressure plate 66 and the neck terminates flush with the upper face of the pressure plate. Clearance 71 is provided between the neck 69 and the pressure plate 66 to permit relative lateral movement between the pressure member 68 and pressure plate 66 and to permit the lubrication of the relative slidable surfaces. In Fig. 12, the pressure plate 72 has a central opening 73 therethrough to permit effective lubrication of the relatively slidable lower face of pressure plate 72 and upper face of pressure member 74.

Figs. 3, 9, 13, 14 and 15 show further modifications of the dust shield 41 of Fig. 1. In Fig. 3, the dust shield has an intermediate tubular portion 75 loosely encircling the shank of the stud member, with enlargements or beads 76 and 77 at its ends. The upper end preferably extends radially inwardly as at 78 and engages the lower face of the housing 21. The other end 77 of the shield may be removably supported on a ring 79 that is free to rotate on the stud shank 26. A coil spring 81 is positioned within the shield to urge the ends of the latter apart, thus allowing relative rotation to take place at the junction of the ring 79 and the stud shank.

In the modification shown in Fig. 9, the intermediate tubular portion 82 of the dust shield has end beads 83 and 84, respectively, at its upper and lower ends, the latter bead being free to rotate in a channel ring 85 on the stud shank 26. The upper bead 83 is stretched tight on a metal rim 86 secured to the lower end of the housing 21. In Fig. 13, the upper end 87 of the rubber shield is preferably molded and thus anchored to a downwardly directed flange 88 of an angle member 89 carried by the lower end of the housing 21. In Fig. 14, the stud shank 26 carries a flange or rib element 91 fixed thereon and the adjacent end 92 of the rubber shield is provided with a channel 93 to rotatably receive the rib 91. In Fig 15, an angle element 94 is carried by the lower end of the housing 21, to tightly receive, as by stretching, an enlarged upper bead 95 of the rubber shield, while a lower bead 96 is freely secured to a channel 97 secured to the stud shank 26. A spring 99 is provided within the shield to force the members 94 and 97 into tight engagement with beads 95 and 96, respectively. This coil spring will telescope angularly to allow relative angular movement of the stud within chamber 23.

It is obvious that any one of the above described shield constructions may be attached interchangeably to any of the modifications of the joint shown in Figs. 1, 3 and 9.

Although I have described preferred embodiments of the invention is considerable detail, it will be understood that the description is intended to be illustrative rather than restrictive and it is apparent that many details may be modified or changed without departing from the spirit or the scope of the invention. Accordingly, I do not intend to be restricted to the exact structures disclosed.

I claim:

1. A joint assembly comprising a housing having an axial bore extending therethrough, one end of said housing being provided with a concave bearing surface and the other end with a closure member; a stud projecting into said bore, the said stud having a partial spherical ball head provided with an internal spherical shaped cavity, the said head being seated on said concave surface and adapted for universal movement therewith; a pressure element one end of which is spherical in form and the other end terminating in a planar surface, the spherical end of said element being seated in said internal cavity in said ball head and the planar end projecting outwardly therefrom; a pressure plate having a flat surface seated on the planar surface of said pressure element; and resilient means interposed between said pressure plate and closure member.

2. A joint assembly as claimed in claim 1 in which the pressure plate is provided with grease openings and a peripheral flange.

References Cited in the file of this patent
UNITED STATES PATENTS

| | | |
|---|---|---|
| 541,727 | Dennis | June 25, 1895 |
| 1,474,854 | Spire | Nov. 20, 1923 |
| 1,788,083 | Church | Jan. 6, 1931 |
| 1,829,964 | Randall | Nov. 3, 1931 |
| 1,963,112 | Baker | June 19, 1934 |
| 2,054,082 | Hufferd | Sept. 15, 1936 |
| 2,083,718 | Kull | June 15, 1937 |
| 2,122,655 | Niles | July 5, 1938 |
| 2,240,432 | Witchger | Apr. 29, 1941 |
| 2,274,418 | Katcher | Feb. 24, 1942 |
| 2,298,544 | Ulinski | Oct. 13, 1942 |
| 2,421,588 | Venditty | June 3, 1947 |
| 2,539,186 | French | Jan. 23, 1951 |
| 2,569,823 | Moskovitz | Oct. 2, 1951 |

FOREIGN PATENTS

| | | |
|---|---|---|
| 508,890 | Great Britain | of 1939 |